United States Patent [19]
Yorgiadis

[11] 4,453,422
[45] Jun. 12, 1984

[54] STRAIN GAGE LOAD CELL HAVING IMPROVED SENSITIVITY

[76] Inventor: Alexander Yorgiadis, 1404 Garza St., Anaheim, Calif. 92804

[21] Appl. No.: 341,596

[22] Filed: Jan. 22, 1982

[51] Int. Cl.³ .................................................. G01L 1/22
[52] U.S. Cl. ........................................ 73/862.66; 338/5
[58] Field of Search ............... 73/768, 862.62, 862.64, 73/862.65, 862.66, 862.67; 338/5

[56] References Cited

U.S. PATENT DOCUMENTS

| | | |
|---|---|---|
| 3,196,676 | 7/1965 | Pien . |
| 3,365,689 | 1/1968 | Kutsay . |
| 3,599,479 | 8/1971 | Kutsay . |
| 3,602,866 | 8/1971 | Saxl ................................ 73/862.66 |
| 4,175,428 | 11/1979 | Eilersen ......................... 73/862.64 |
| 4,203,318 | 5/1980 | Yorgiadis . |

FOREIGN PATENT DOCUMENTS

| | | | |
|---|---|---|---|
| 1518359 | 7/1978 | United Kingdom | .................... 338/2 |
| 451928 | 3/1975 | U.S.S.R. | ....................... 73/862.66 |

Primary Examiner—Charles A. Ruehl
Attorney, Agent, or Firm—Eugene E. Geoffrey, Jr.

[57] ABSTRACT

A strain gage load cell having a body of material formed with a reduced section which is subjected to shear stresses when a load is applied to the body in a manner to deform the reduced section, a strain gage receiving opening formed in the reduced section so that deformation of the latter will deform at least part of the opening and cause it to assume an ovular configuration and at least one strain gage secured to the wall of the deformable portion of the opening and preferably aligned with one of the axes of the deformed portion of the opening.

4 Claims, 16 Drawing Figures

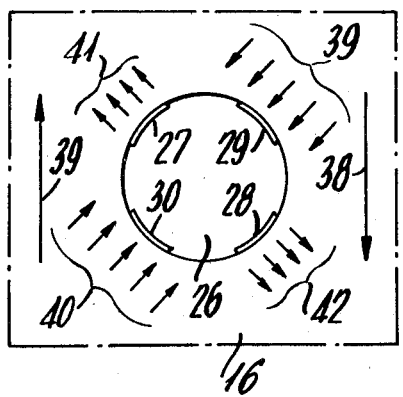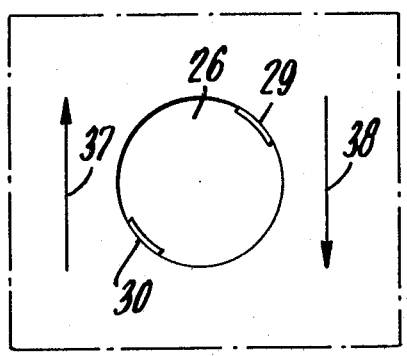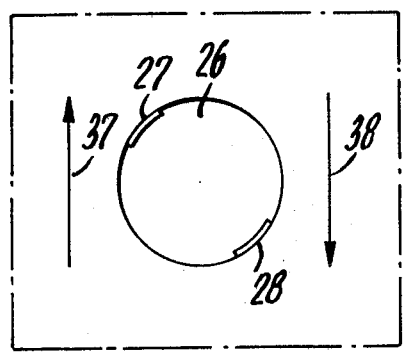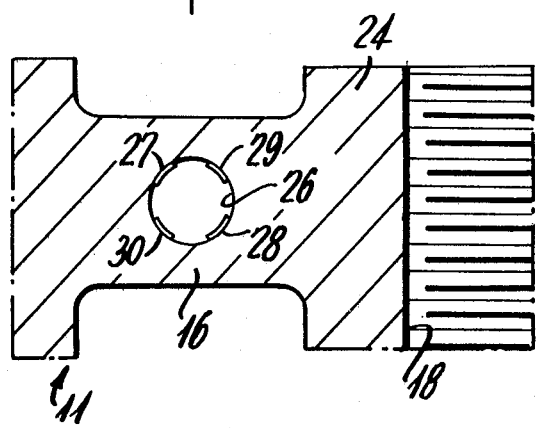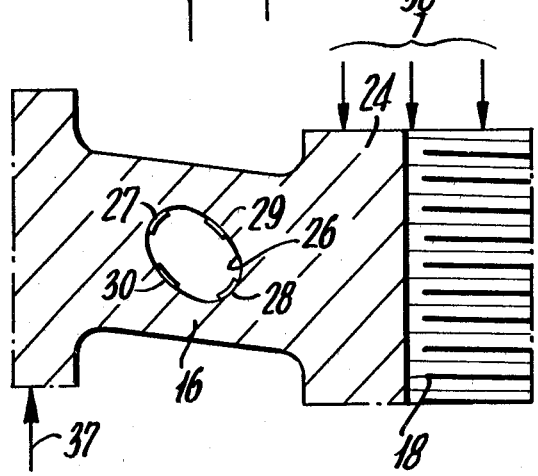

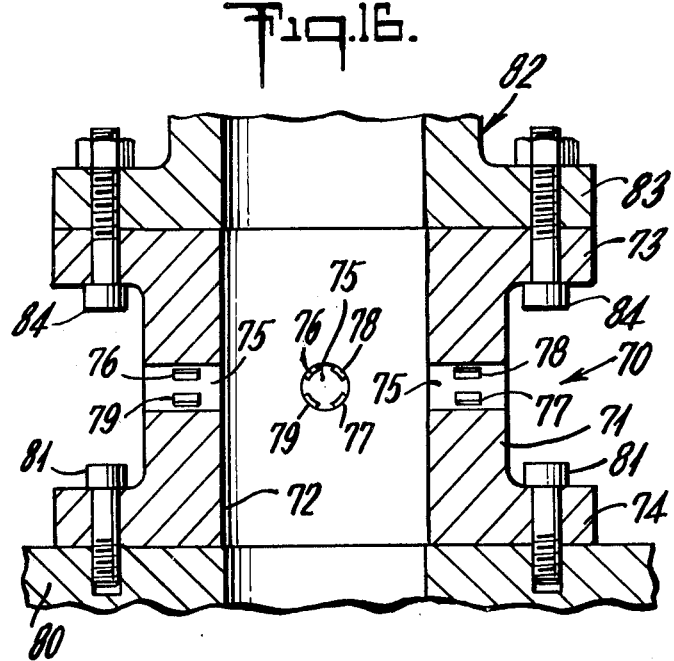
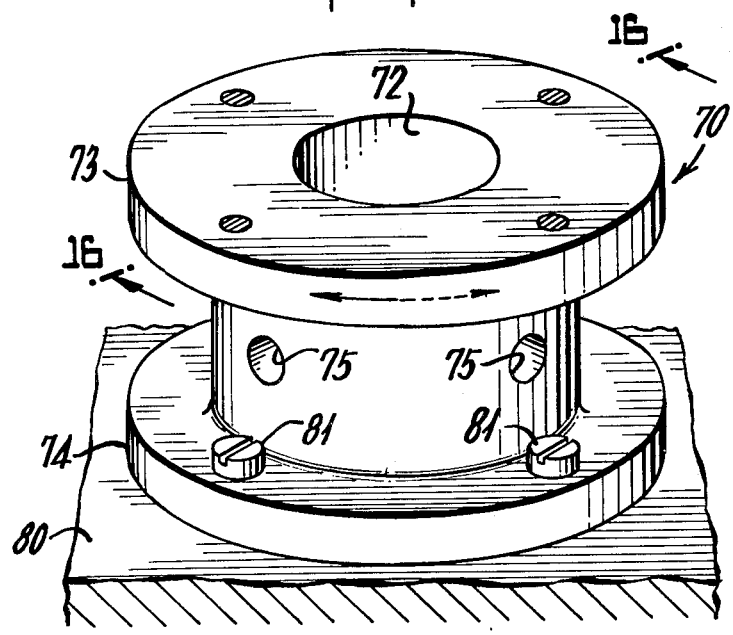

STRAIN GAGE LOAD CELL HAVING IMPROVED SENSITIVITY

This invention relates to load cells embodying strain gages and more specifically to a novel and improved load cell which affords greatly increased sensitivity, an improved signal to noise ratio and the ability of the load cell to measure loads that are small in comparison to the capacity of the cell.

A typical example of a prior load cell is shown in U.S. Pat. No. 3,365,689. This type of cell is generally referred to as a low profile load cell and is formed of a disc of relatively thick material having an annular recess formed in each surface to provide a web of reduced thickness between the hub and the rim. A plurality of radially disposed holes extend from the periphery of the disc to points within the narrowed web portion to receive strain gages. This type of cell has a sensitivity, when using a Wheatstone bridge for conversion of resistance changes of the strain gages to voltage changes, of approximately 2 millivolts per volt input to the bridge at full load.

The strain gage load cell in accordance with the invention embodies a new and improved arrangement and orientation of strain gages within the load cell which overcomes the limitations of prior known structures and affords greatly increased sensitivity. Moreover, the increased sensitivity is readily attainable with a cell of unitary construction and one wherein the strain gages can be placed in a position protected from mechanical damage as well as exposure to the ambient atmosphere. Moreover, the advantages of this invention can be realized in a wide variety of load cell applications, for example, low profile load cells, simple beams, cantilevers and torsion load cells.

Another object of the invention resides in the provision of a novel and improved strain gage load cell which overcomes the limitations of prior known structures and affords an improved signal to noise ratio and reduced sensitivity to off-center loads.

Still another object of the invention resides in the provision of a novel and improved strain gage load cell that has reduced sensitivity to external pressure.

A still further object of the invention resides in the provision of a novel and improved sensitive strain gage load cell characterized by its compactness, simplicity and utility in a large variety of applications.

The strain gage load cell in accordance with the invention involves the provision of a member deflectable under a load and an opening disposed in said member in such a manner that said opening, when the member is stressed, is distorted to form an ovular configuration. Strain gages are affixed to the wall of the opening in the strain region with the result that certain of the gages will be subjected to tensile stress while other gages are subjected to compressive stress. By connecting the gages in a bridge circuit, greatly increased sensitivity is realized not heretofore attainable with prior known structures.

The above and other objects and advantages of the invention will become more apparent from the following description and accompanying drawings forming part of this application.

IN THE DRAWINGS

FIG. 3 is a diagrammatic illustration depicting the load applied to a load cell in accordance with the invention;

FIG. 4 is a cross sectional view of a portion of the web of FIG. 1 in an unloaded condition;

FIG. 5 is a view similar to FIG. 4 with the web loaded;

FIGS. 6 and 7 illustrate alternate modes for installing strain gages in the embodiment of FIG. 1;

FIG. 15 is a perspective view of a torsional load cell embodying the invention; and FIG. 16 is a cross sectional view of FIG. 15 taken along the line 16—16 thereof.

Figure 1:
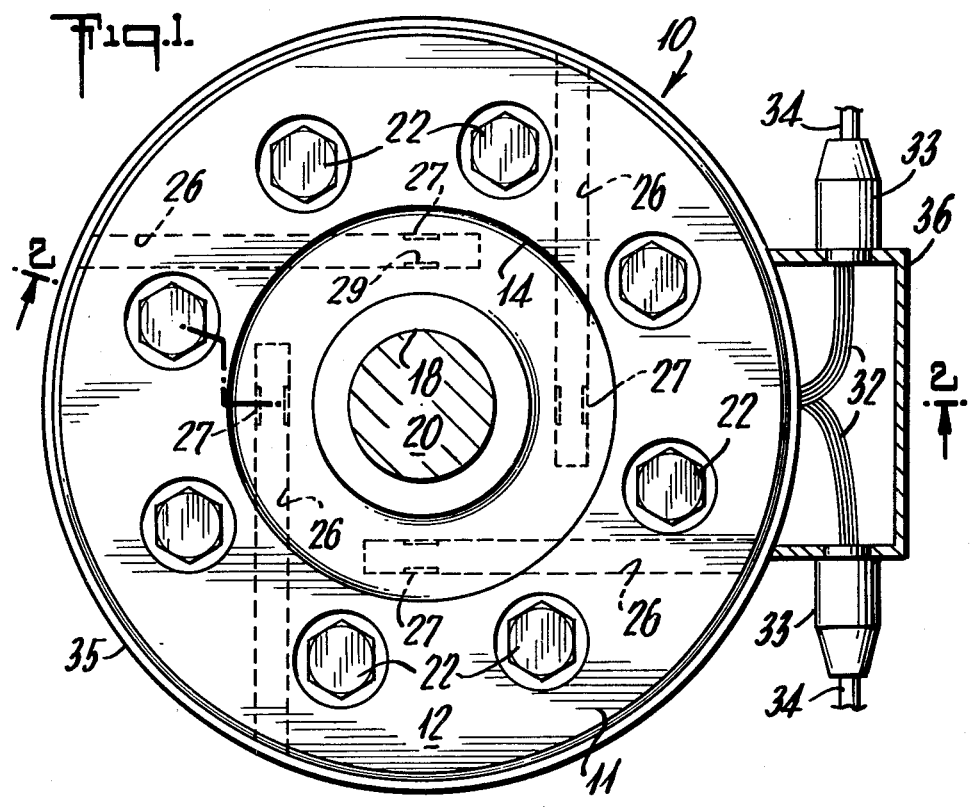
FIG. 1 is a plan view in partial section of one embodiment of a load cell in accordance with the invention.
Figure 2:
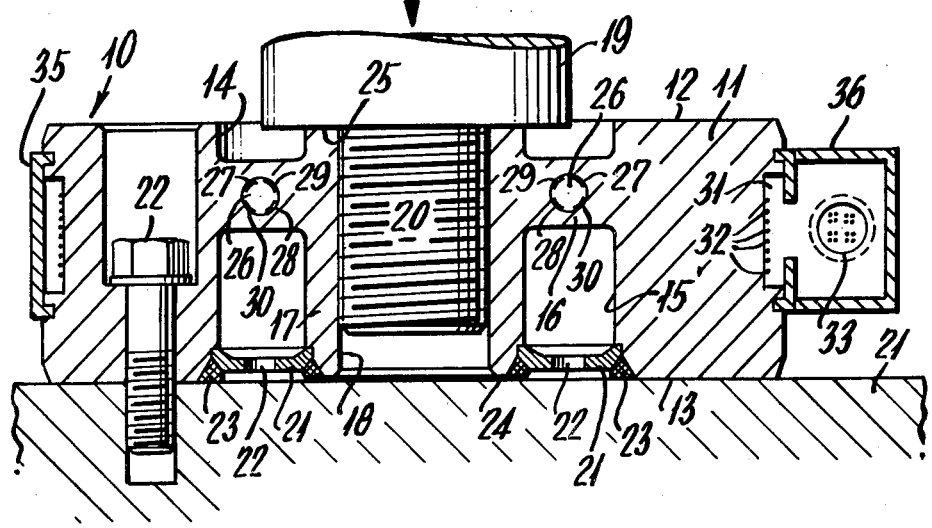
FIG. 2 is a cross sectional view of FIG. 1 taken along the line 2—2 thereof.
Figure 8:
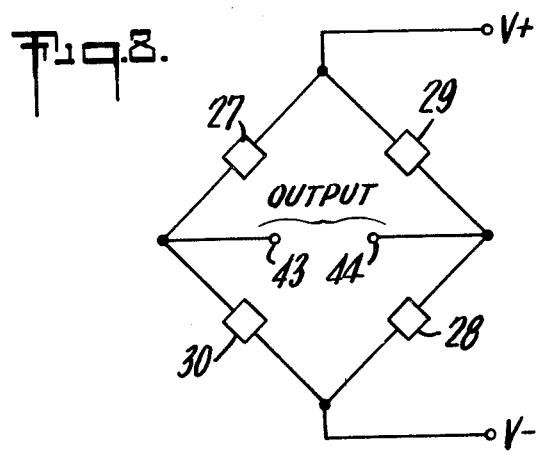
FIGS. 8 and 9 show two variations of bridge circuits for use with load cells in accordance with the invention.

Referring now to the drawings and more specifically to FIGS. 1 and 2, the illustrated embodiment of a load cell is denoted by the numeral 10 and is generally referred to in the art as a low profile load cell. The cell is formed of a circular body of material 11 having parallel upper and lower surfaces 12 and 13 respectively. The surface 12 has an annular recess 14 while the surface 13 has a somewhat deeper annular recess 15. The recesses 14 and 15 form a relatively thin annular web 16 and define a central hub 17 having a threaded opening 18 for the attachment of a loading member 19 having a threaded portion 20 for engagement of the threaded opening 18. The body of the load cell in the instant embodiment of the invention is affixed to a stationary surface 21 by means of a plurality of recessed bolts 22. The annular recess 15 is closed by an annular plate 21 having a plurality of openings 22 therein. The plate 21 may be held in position by welds 23 or any other suitable means. It will be observed that the hub 17 has a bottom edge 24 which is spaced from the surface of the support 21 and if desired the top end 25 of the hub 17 may also be terminated at a point below the upper surface of the body 11. With this arrangement, as a load is applied to the member 19, the hub will be deflected axially and subject the web to shear stresses and strains.

In accordance with the invention, strain gage receiving openings 26, of which four are illustrated in FIGS. 1 and 2, are drilled into the body of the load cell 11 with the axis of each opening substantially tangential to an invisible circle defining the mid span of the web 16. One or more strain gages are disposed within each opening 26 with the gages in each opening substantially aligned with a radius of the body 11. In the illustrated embodiment of the invention, four strain gages 27 through 30, as shown in FIG. 2, are mounted within each of the openings 26. The periphery of the body 11 has an annular recess 31 for accommodating the wiring 32 from the strain gages 27 through 30 and these wires are then attached to connectors 33 in the usual manner with cables 34 leading from the connectors to suitable indicating equipment to be described. The recess 31, with the wires 32 disposed therein, is sealed by an annular ring 35 and the connectors 33 are carried by a housing element 36 attached to the ring 35. With this arrangement, the strain gages are protected from mechanical injury and from the ambient atmosphere.

Referring now to FIG. 3, which illustrates diagrammatically the shear stresses and strains about one of the openings 26 when the web 16 of the cell is subjected to compression loading as indicated by the arrows 37 and 38. Under these conditions, web 16 is subjected to shear stresses and strains which have a maximum value in the vertical and horizontal directions. Upon examining the stresses and strain distributions in the web in other directions, it is seen that shear stresses become zero along the two 45 degree directions. One of these directions is subjected to maximum compressive strains as depicted by arrows 39 and 40. The other 45 degree direction is subjected to tensile stresses and strains as depicted by arrows 41 and 42. The effect of these stresses will be observed in FIGS. 4 and 5. FIG. 4 is a cross sectional view of FIG. 1 taken along a radius of the load cell which intersects the strain gages in one of the openings 26. It will be observed that the opening 26 is circular prior to the application of a compressive load. When the compressive load is applied, the cross sectional configuration of the opening 26 is deformed as illustrated in FIG. 5. It will be observed that the opening is now distorted to produce an ovular configuration and as a result the gages 27 and 28 are subjected to compressive strains while the gages 29 and 30 are subjected to circumferential strains. Since the gages 29 and 30 are disposed at 90 degrees to the gages 27 and 28 and since the gages are positioned at 45 degree angles relative to the neutral axis of the load cell, the gages 27, 28 and 29, 30 are subjected to opposite strains. It will also be observed that the major axis of the elipse, as shown in FIG. 5 with the load cell under compression, is inclined at 45 degrees downwardly in the direction of the hub 24. When the load cell is subjected to tensile stress, the major axis of the elipse will be inclined upwardly toward the hub 24.

For convenience, four gages have been shown as being mounted in a single opening in FIGS. 3, 4 and 5. In normal practice, however, two gages would be mounted in each of the four openings shown in FIG. 1 and the positions of the gages are diagrammatically illustrated in FIGS. 6 and 7. FIG. 6 illustrates one opening 26 having gages 29 and 30 while FIG. 7 illustrates another opening carrying gages 27 and 28. The angle of inclination of the gages would be maintained in the same manner illustrated and described in connection with the preceding figures and in the case of a load cell such as shown in FIG. 1, two of the openings would each carry two strain gages 27 and 28 while the other two openings would each carry two gages 29 and 30. It is also evident that any number of openings can be utilized in a low profile load cell such as shown in FIG. 1 and any suitable strain gage arrangement may be employed in the openings provided however that certain of the strain gages would be subjected to tensile strains while other of the strain gages would be subjected to compressive stains.

The measurement of resistance changes experienced by strain gages is usually affected by means of a Wheatstone bridge and assuming that the load cell embodies four strain gages within either single or multiple openings, strain gages 27 and 28 would be connected to form opposing legs of the bridge while strain gages 29 and 30 would be connected to form the remaining legs of the bridge. A voltage V is applied between a pair of opposing junctions of the bridge while the output voltage produced by the bridge would be measured between the terminals 43 and 44 connected to the remaining junctions of the bridge. The theory of operation of the Wheatstone bridge is well known and accordingly a detailed description thereof is not necessary. The voltage between the terminals 43 and 44 may of course be measured by any suitable voltage measuring device such as an analog or digital voltmeter. With this arrangement and assuming that the load cell is subjected to compressive stress as illustrated in FIG. 5, gages 29 and 30 will increase materially in resistance while the gages 27 and 28 will experience a decrease in resistance. These changes increase with an increase in the compression loading and produce an unbalance in the bridge and a consequent development of a voltage across the terminals 43 and 44. Since two of the gages experience a decrease in resistance while the remaining gages experience an increase in resistance, substantial imbalance of the bridge occurs and a higher voltage is developed across the terminals 43 and 44 than that obtainable with prior art structures. With the utilization of holes disposed tangentially as distinguished from the radially disposed holes as shown in prior U.S. Pat. No. 3,365,689, a very substantial increase in sensitivity is realized as will be explained in connection with FIG. 10. In fact, with four gages positioned in accordance with this invention, the sensitivity of the gages can be as high as four times the sensitivity of gages positioned in prior known load cells. However, because the strain gages each cover a finite length of the hole circumference, each gage will sense an average strain over the area spanned by the gage and accordingly the resultant sensitivity with the structure in accordance with this invention would be approximately 4 millivolts per volt input to the bridge. With prior known devices, the maximum sensitivity attainable was approximately 2 millivolts per volt input to the bridge.

Figure 9:
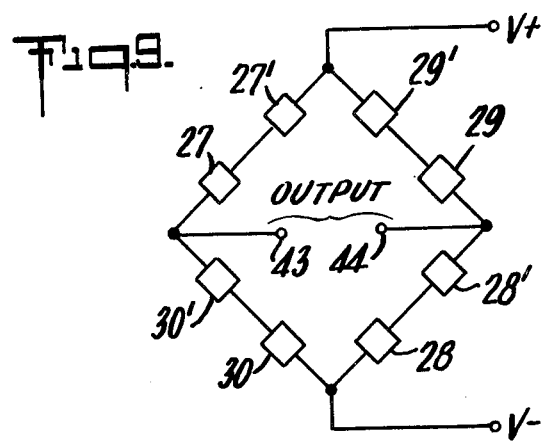

When utilizing a total of eight strain gages positioned in the openings 26 in the manner illustrated for instance in FIGS. 6 and 7, the strain gages can be connected in series as illustrated in FIG. 9. For instance, the gages 27 and 27' occupying similar positions would be connected in series and similarly the gages 28 and 28', 29 and 29' and 30 and 30' would be similarly arranged. It is evident however that any suitable gage arrangement can be employed with the gages connected either in series or parallel for the purpose of averaging the effects of the gages.

Figure 10:
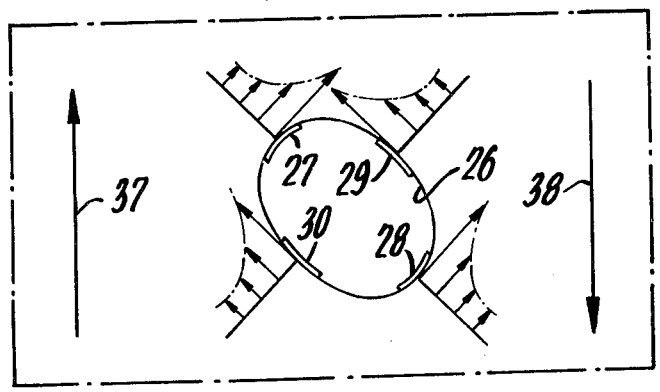
FIG. 10 is a diagrammatic view of a strain gage receiving opening illustrating the stress distributions to which strain gages are subjected.

FIG. 10 is a diagrammatic illustration of the stresses applied to a hole such as a hole 26 shown in FIG. 1 when distorted into an eliptical shape after the application of a shear load. The greatest strain occurs at points essentially coincident with the major and minor axes of the eclipse and decrease as the distance from the major and minor axes increase. Since the strain gages are all of finite length, the gages will measure an average strain experienced over the length of the strain gage. Thus, by maintaining the size of the strain gage as small as possible without materially modifying its sensitivity, the resultant sensitivity of the load cell will of course be increased. Under practical conditions wherein a strain gage has a length which is approximately one-fifth of the length of the hole circumference, the increase in magnification is approximately 2 to 1. This can be attained only through the positioning of the openings containing the strain gages so that they are perpendicular to the shear plane produced by compression or tension loading and cannot be attained when the openings are drilled along a radius of a low profile load cell such as illustrated in the prior art. With strain gages arranged in accordance with the invention, sensitivities to external pressures and off-center loads are reduced materially.

The discussion thus far has been confined essentially to a low profile load cell as shown in FIGS. 1 and 2. It is evident however that this invention is equally applicable to other types of load cells such as cantilever beams, the simple beams and cells for the measurement of torsional loads.

Figure 11:
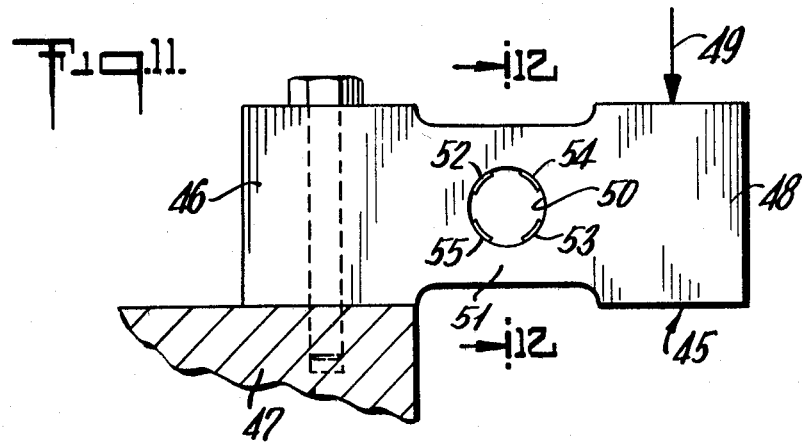
FIG. 11 illustrates the application of the invention to a cantilever beam.

FIG. 11 illustrates a cantilever beam generally denoted by the numeral 45 which may be either rectangular or round in cross section having one end portion 46 secured to a stationary member 47 and an end portion 48 which may be subjected to a load represented by the arrow 49. The hole 50 which corresponds to the hole 26 of FIG. 1 is drilled through the shear portion 51 of the beam and the gages 52 through 55 are positioned in the same manner as described in connection with the previous embodiment of the invention. It is evident that as a load 49 is applied to the cantilever beam the opening 50 will be distorted to form an eliptical or ovular configuration and thus afford the improved sensitivity previously discussed. The ends of the opening 50 are also sealed to protect the gages mounted therein.

Figure 12:
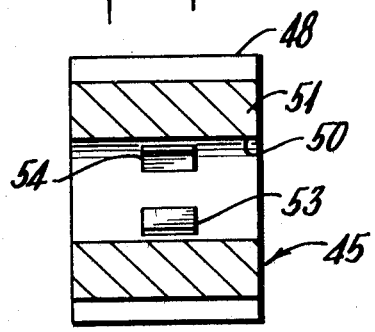
FIG. 12 is a cross sectional view of FIG. 11 taken along the line 12—12 thereof.
Figure 14:
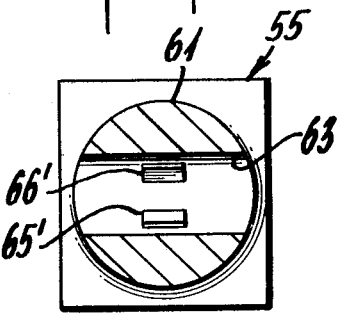
FIG. 14 is a cross sectional view of FIG. 13 taken along the line 14—14 thereof.
Figure 13:
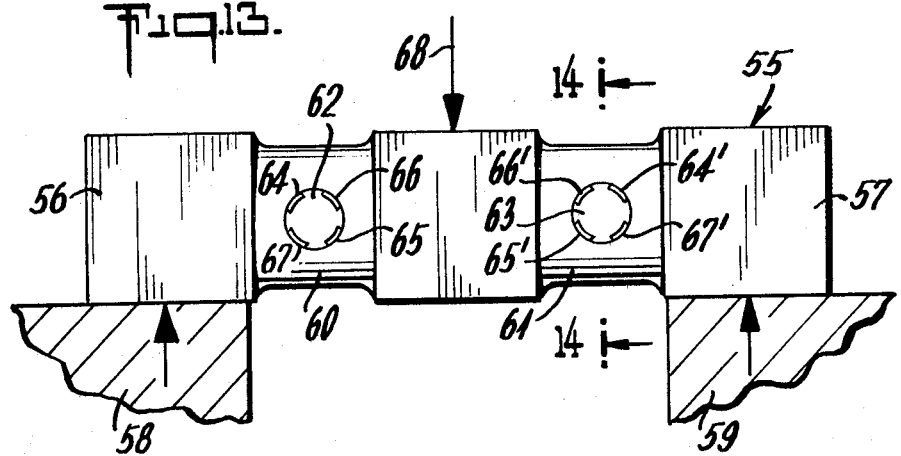
FIG. 13 illustrates the application of the invention to a simple beam.

The application of the invention to a simple beam is illustrated in FIGS. 12 and 13. The beam is generally denoted by the numeral 55 and includes end portions 56 and 57 supported by stationary members 58 and 59. Areas 60 and 61 are of reduced section for the purpose of concentrating shear stresses and openings 62 and 63 are drilled in a direction perpendicular to the beam. Gages 64 through 67 are positioned in the opening 62 while gages 64' through 67' are positioned within the opening 63. These gages are positioned in the same manner previously described in connection with the embodiment of the invention shown in FIGS. 1 through 5 and in this instance connected in a suitable Wheatstone bridge such as illustrated in FIG. 9. With this arrangement, the openings 62 and 63 when the beam 55 is subjected to a load 68, will be distorted to form an ovular configuration and thus produce the substantial increase sensitivity as previously discussed. As in the case of the cantilever beam, the simple beam may have any desired cross sectional configuration.

FIGS. 15 and 16 illustrate the application of the invention to a torsion load cell generally denoted by the numeral 70. While the cell can take a variety of forms, in the illustrated embodiment it comprises a cylindrical body 71 having a central opening 72 and upper and lower flanges 73 and 74 respectively. Four holes 75 are formed in the cylindrical body 71 at 90 degree intervals through two or more openings equally spaced about the periphery of the cylindrical member 71 may be employed. When utilizing four openings as illustrated in the drawings, either two or four strain gages may be employed in each of the openings. As illustrated, there are four strain gages 76 through 79 in each of the openings though it is apparent that one pair of opposing openings may contain two gages 76 and 77 whereas the remaining pair of opposing openings may contain two gages 78 and 79. The gages would of course be connected to form a Wheatstone bridge as discussed in connection with preceding embodiments of the invention.

For purposes of illustration, the flange 74 is illustrated as being fastened to a stationary plate 80 by means of a plurality of bolts 81 while the flange 73 is bolted to the loading member 82 having a flange 63 bolted to the flange 73 by means of a plurality of bolts 84. With this arrangement, when a torsion load is applied to the loading member 82 the cylindrical portion 71 of the torsion load cell will be subjected to a shear stress and this will cause the openings 75 to be distorted to form an ovular configuration as in the case of the preceding embodiments of the invention. It is also understood that the openings 75 would include appropriate seals at the ends thereof to protect the strain gages 76 through 79 in each of the openings from both physical damage as well as damage resulting from contaminates in the atmosphere.

From the foregoing description of several embodiments of the invention, it is clear that substantially improved sensitivity has been attained through the positioning of the strain gage receiving openings in such a manner as to cause the openings to be distorted to form an ovular configuration when subjected to shear stresses. This procedure affords material advantages in addition to improved sensitivity, namely the rendering of the load cell substantially insensitive to changes in external pressure and to off-center loads. Furthermore, with the gages disposed within openings which may be sealed, the gages are protected against mechanical damage as well as damage which may result from exposure to the ambient atmosphere.

While only certain embodiments of the invention have been illustrated and described, it is apparent that alterations, changes and modifications may be made without departing from the true scope and spirit thereof.

What is claimed is:

1. A strain gage load cell comprising a body of material, means for applying a load to said body to subject the body to shear stress, said body having at least two openings therein and positioned relative thereto to cause at least a portion of each opening to be distorted to form an ovular configuration when said load is applied to said body, and at least one strain gage disposed within said portion of each opening to sense circumferential strain, said body of material being of circular configuration having appreciable thickness and having a circular area of reduced thickness disposed between a central hub and a peripheral rim, said means for applying a load to said body displacing said hub axially relative to said rim and thus subjecting said area of reduced thickness to shear, each of said openings having an axis extending in tangential relationship to a hypothetical circle concentric with said area of reduced thickness and said portion of each opening disposed within said area, wherein each strain gage disposed with each opening is approximately aligned with a radius of said body, and is disposed at an angle within its associated opening of approximately 45° relative to the axis of said hub.

2. A strain gage load cell according to claim 1 wherein each of said openings includes two diametrically disposed strain gages.

3. A strain gage load cell according to claim 2 wherein each of said openings includes two additional diametrically disposed strain gages positioned at 90° relative to said two diametrically disposed strain gages.

4. A strain gage load cell according to claim 3 including a Wheatstone bridge having four legs and corresponding ones of said strain gages in each of said openings are interconnected one with the other and each pair of interconnected gages constitutes one leg of said bridge.

* * * * *